United States Patent [19]
Valdez

[11] 3,923,117
[45] Dec. 2, 1975

[54] BUMPER ACTUATED GROUND ENGAGING BRAKE

[76] Inventor: Marcos E. Valdez, 1919 Fruitvale Ave., No. C, Oakland, Calif. 94601

[22] Filed: Jan. 23, 1974

[21] Appl. No.: 435,709

[52] U.S. Cl. ................................ 180/93; 293/84
[51] Int. Cl.² ...................................... B60R 19/02
[58] Field of Search ............ 180/91, 92, 93, 94, 95; 293/84

[56] References Cited
UNITED STATES PATENTS

| | | |
|---|---|---|
| 1,619,823 | 3/1927 | Klein .................................. 180/93 |
| 1,676,525 | 7/1928 | Conti .................................. 180/92 |
| 1,755,007 | 4/1930 | Jackson .............................. 293/84 |
| 1,972,404 | 9/1934 | Karl .................................... 180/93 |

Primary Examiner—Robert S. Ward, Jr.
Assistant Examiner—Robert Saifer

[57] ABSTRACT

A bumper mechanism for automobiles, consisting primarily of pivotable leaf members with pulleys attached that are guided between a front and rear guide bar forwardly of the bumper of the automobile, pulley means between the leafs carrying a cable which is carried upon a rearward cable that activates a spring returnable lifting bar with braking wheels.

4 Claims, 4 Drawing Figures

BUMPER ACTUATED GROUND ENGAGING BRAKE

This invention relates to automotive vehicle bumpers, and more particularly to a vehicle bumper mechanism.

It is therefore the principal object of this invention to provide a vehicle bumper mechanism which when attached to a vehicle will impart a braking action at the rear wheels of the vehicle.

Another object of this invention is to provide a bumper mechanism which will include pivotable leaf members which are spaced apart and will carry pulleys that may be urged towards each other and away from each other between guide bar members forwardly of the bumper secured to the chassis of the vehicle.

Still another object of this invention is to provide a bumper mechanism of the type described which will include a plurality of pulleys which carry cable means for activating a lifting axle carrying braking wheels which will lift the vehicle upon impact while effecting a braking action.

Yet another object of this invention is to provide a bumper mechanism of the type described which will have spring return means for each wheel end portion of the lifting axle, the springs being connected at their opposite ends to a cross bar fixedly secured between the side rails of the vehicle chassis.

Other objects of the invention are to provide a vehicle bumper mechanism which is simple in design, inexpensive to manufacture, rugged in construction, easy to use and efficient in operation.

These and other objects will be readily evident upon a study of the following specification and together with the accompanying drawings, wherein.

Figure 1:
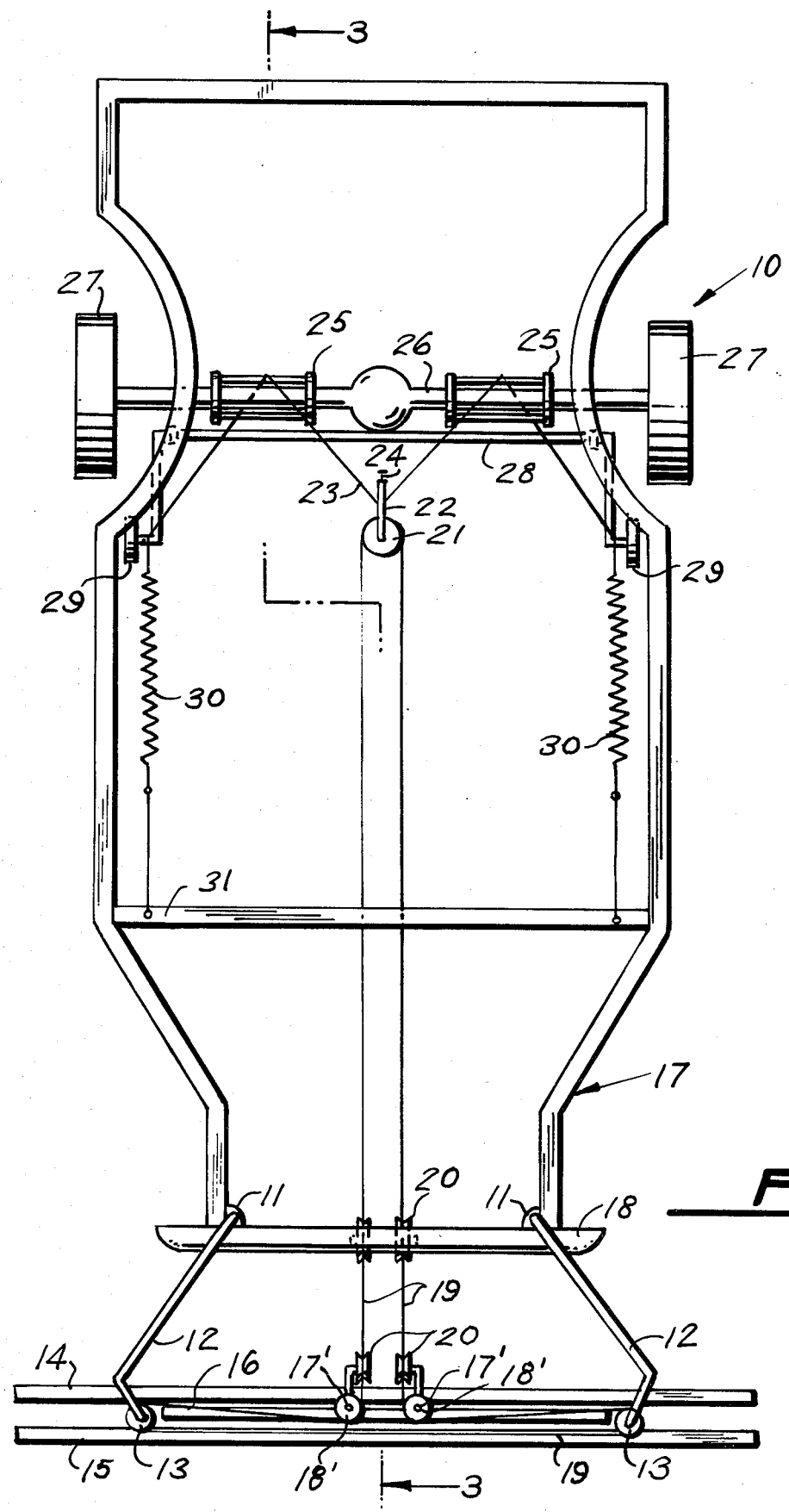
FIG. 1 is a diagrammatic top plan view of the present invention.
Figure 2:
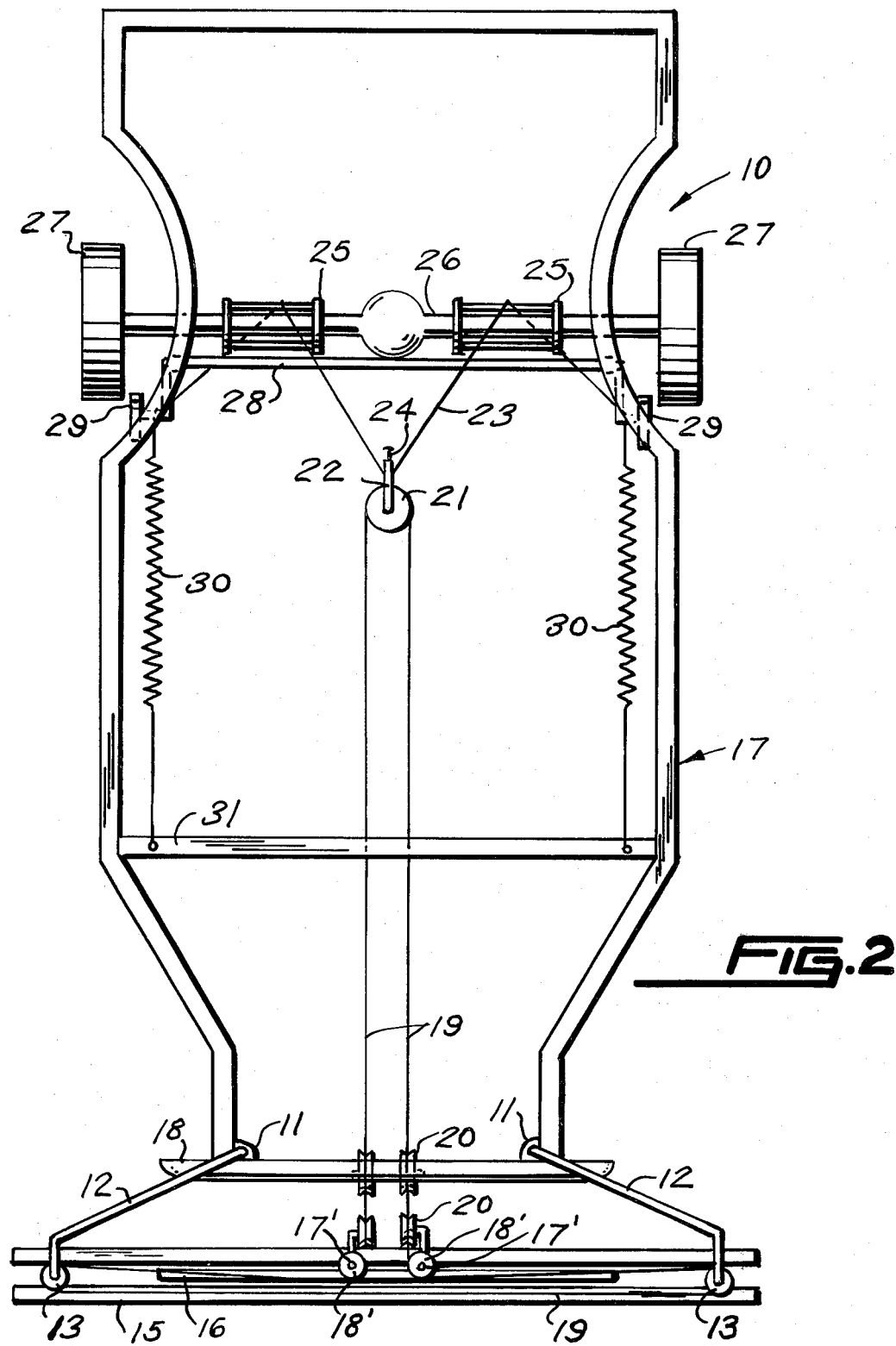
FIG. 2 is a similar view to FIG. 1, but shows the device in the impact position.
Figure 4:
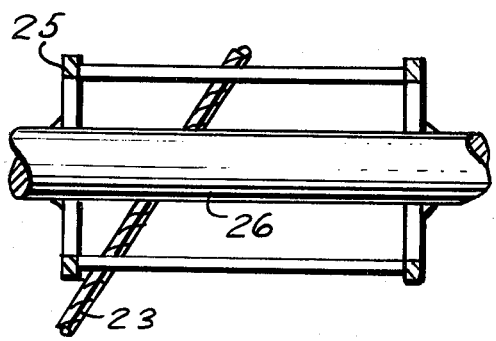
FIG. 4 is an enlarged horizontal view of one of the axle spools shown removed from the invention and shown in elevation.
Figure 3:
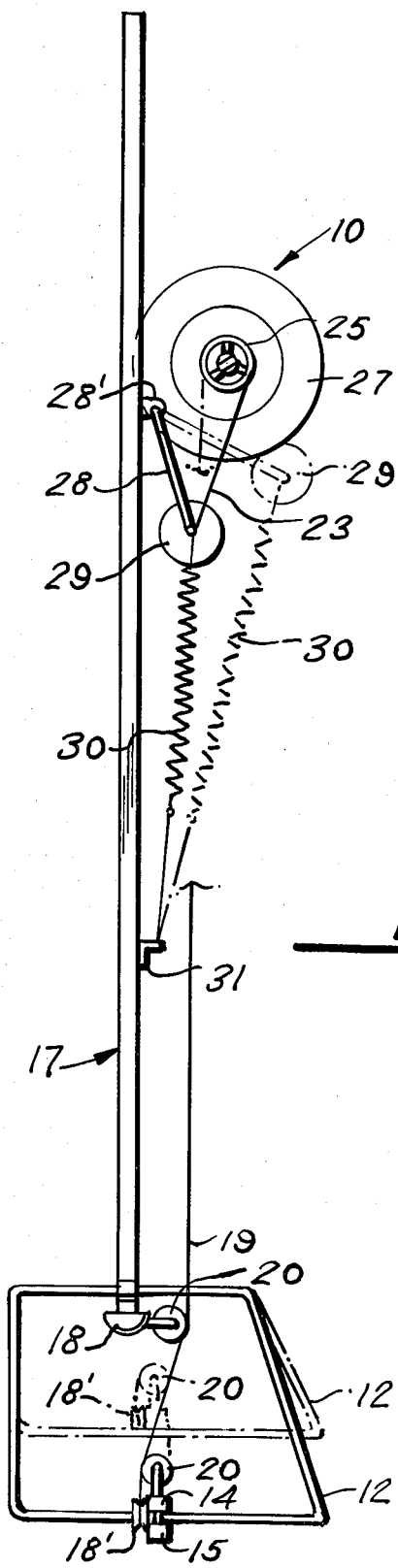
FIG. 3 is a fragmentary cross-sectional view taken along the lines 3—3 of FIG. 1.

According to this invention, a vehicle bumper mechanism 10 is shown to include a pair of spaced apart hinges 11 pivotably carrying, each, a leaf 12 having a pulley 13 thereon. The pulleys 13 are guideable between a pair of spaced apart guide bars 14 and 15. A separator bar 16 is suitably welded to the front guide bar 15 and the rear guide bar 14, the arrangement enabling the pulleys 13 of leaves 12 to extend outwards from each other upon impact of the vehicle device 10 is attached to. The hinges 11 of leaves 12 are fixedly secured by welding or other suitable means, to the front end of chassis 17 to which is secured bumper 18 in a well known manner. A pair of spaced apart pulleys 18 are secured to bracket members 17 fixedly secured to rear guide bar 14. Carried upon the pulleys 13 and 18, is an endless cable 19, the cable 19 also being supported and carried by pulleys 20, the forward pair of pulleys 20 being secured to rear guide bar 14 and the rearwardly positioned pulleys 20 being secured to bumper 18. The endless cable is carried on a pulley 21 freely and rotatably carried by member 22. A cable 23 is secured to member 22 by means of a screw fastener 24, the cable 23 extending over a pair of spaced apart spool members 27 welded to the axle housing 26 which carries the rear wheels 27. A lifting axle 28 parallel with the axle housing 26 is provided with a wheel 29 on each end. The cable 23 is fixedly secured to the lifting axle 28 in a suitable manner (not shown), the same point of attachment, being secured to one end of a spring 30. The pair of springs 30 lay spaced apart and parallel with the inside portion of chassis 17 the opposite ends of the springs 30 being fixedly secured in a suitable manner to a crossbar member 31 which is welded or otherwise secured between the side portions of chassis 17.

Prior to impact, the leaves 12 are normally at approximately 45 degrees with respect to the longitudinal axis of the chassis 17. When impact occurs at the forward portion of bumper mechanism 10, the guide bars 14 and 15 are urged rearwards, the resulting action causing the pulleys 13 to move outwards between the guide bars 14 and 15, the result being that pulley 21 will be urged forwardly towards the front of the vehicle. The above mentioned action causing the cable 23 to rotate the lifting axle 28 carrying the braking wheels 29 to be rotated downwards along the hinged point 28 of chassis 17. The braking wheels 29 when contacting the ground during impact of the vehicle, removes the weight from the power driven wheels 27 of the vehicle.

It shall be noted that the braking action of braking wheels 29 will become very evident when wheels 27 are no longer propelling the vehicle forward.

The return of braking wheels is effected by means of the springs 30 attached at one end to bar 31 and at the other end to the lifting axle 28.

What I now claim is:

1. A bumper mechanism adapted for attachment to a vehicle having a chassis including side frames, rear wheels carried by axle means and being carried by said chassis and a front bumper, said mechanism comprising a pair of pivotable leaf members adapted to be hingeably carried upon the chassis of a vehicle, an endless cable pulley means carried by said leaf members for carrying an endless cable, a pair of front and rear guide bars extending transversely of said side frames forwardly of said bumper, providing guide means for said pulleys, a separator bar carried by and positioned between said guide bars for securing said bars together, a pair of pulleys carried by said guide bar for the horizontal mounting of said cable forwardly of said bumper, a second pair of vertical pulleys for carrying said cable, a horizontal rear pulley, a rear wheel lifting axle, spring means normally urging said axle into an inoperative position, a pair of spools carrying a second cable attached to the support of said horizontal pulley in the rear of said vehicle, said front and rear guide bars being supported by the mounting means of the pulleys attached to said leaf members, the opposite ends of said leaf members being supported hingeably between the side frames of said chassis rearwardly of said bumper, said pulleys of said leaves being guided towards the outside ends of said guide bars when impact occurs at the forward portion of said vehicle.

2. The combination according to claim 1 whereby said pulley means of said leaf members together with said pair of horizontal pulleys secured to the rear guide bar of said mechanism carry said cable along the longitudinal axis of said chassis of said vehicle, said cable being further supported upon vertical pulleys in pairs, one of said pairs being secured to the rear guide bars and the other of said pairs being secured to said bumper, said endless cable carried by said pulleys at the forward end of said vehicle and extending rearwardly therefrom and being further carried by a pulley positioned between said side frames and adjacent said rear wheels, said latter pulley being horizontal and secured to a second cable, said second cable being carried upon a pair of spool members secured to said axle means carrying said drive wheels of the vehicle, said cable carried thereon being secured at its opposite end to said lifting axle, said lifting axle carrying a pair of braking wheels.

3. The combination according to claim 2 wherein said lifting axle extends across the chassis in the rear wheel vicinity, and is supported pivotably within brackets means fixedly secured to said chassis on its underside, said braking wheels being pivotably urged downward to release the weight from the drive wheels when impact occurs at the forward end of said vehicle, the effect being achieved by said leaves spreading outwards from each other, thus carrying said pulleys outwards towards the ends of said bars, the result being that said rearward pulley horizontally positioned and carrying said second cable carried by said spools will be pulled, thus pulling said lifting axle downwards carrying said braking wheels to effectively brake said vehicle.

4. The combination according to claim 3, wherein each of said ends of said lifting axle is secured to said spring means, the opposite end of said spring means being secured to cross bar means fixedly secured between the sides of said chassis, said spring means providing effective return means for said lifting axle to its elevated position after use.

* * * * *